Jan. 15, 1946.   I. M. SMITH   2,392,865
FLUORESCENT LIGHT TUBE CHANGER
Filed June 26, 1944
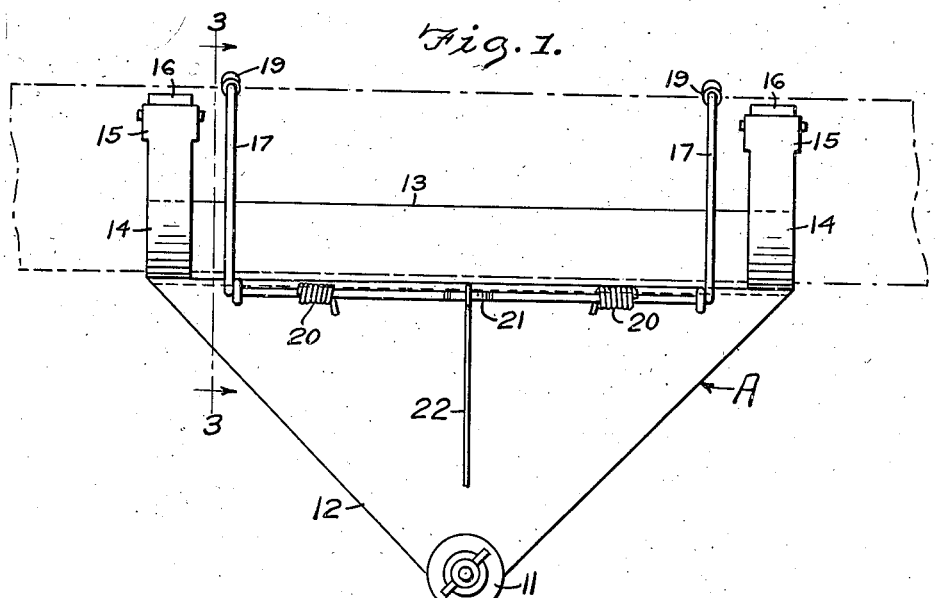
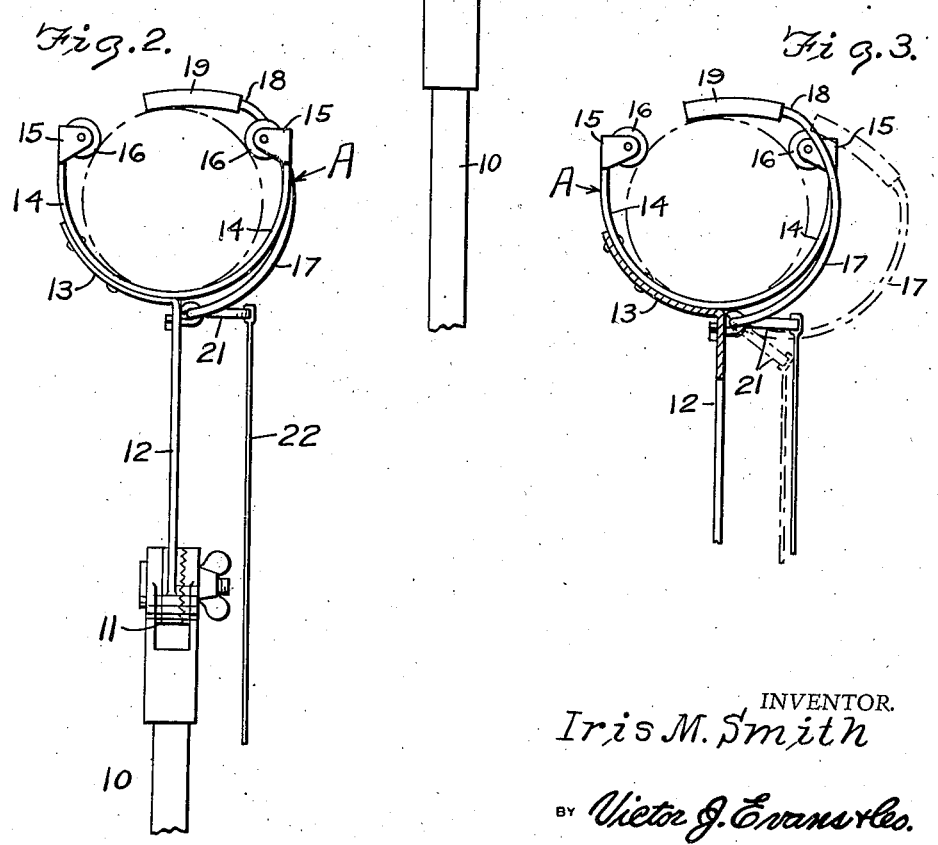
INVENTOR.
Iris M. Smith
BY Victor J. Evans & Co.
ATTORNEYS Patented Jan. 15, 1946

2,392,865

UNITED STATES PATENT OFFICE 2,392,865

FLUORESCENT LIGHT TUBE CHANGER

Iris M. Smith, Detroit, Mich., assignor of one-half to C. Walter Healy, Detroit, Mich.

Application June 26, 1944, Serial No. 542,067

2 Claims. (Cl. 294—20)

The invention relates to a holder, and more especially to a fluorescent light tube changer.

The primary object of the invention is the provision of a device of this character, wherein a fluorescent light tube can be readily and easily placed or removed beyond human reach, and without damage to the said tube or the fixture, the device being of novel construction and is susceptible of convenient handling to enable placement or removal of the tube with dispatch.

Another object of the invention is the provision of a device of this character, wherein it is manually operated and has considerable reach, the light tube being firmly gripped without danger of breaking the same in the placement or removal.

A further object of the invention is the provision of a device of this character, wherein it is susceptible of adjustment for the proper locating of the light tube in a fixture or therefrom.

A still further object of the invention is the provision of a device of this character, which is simple in construction, light in weight, yet strong, durable, possessed of few parts, thoroughly reliable and efficient in operation, easily handled, positive in the working thereof, and inexpensive to manufacture.

With these and other objects in view, the invention consists in the features of construction, combination and arrangement of parts as will be hereinafter more fully described, illustrated in the accompanying drawing, which shows the preferred embodiment of the invention, and pointed out in the claims hereunto appended.

In the accompanying drawing:

Figure 1 is a fragmentary elevation of the device constructed in accordance with the invention.

Figure 2 is a view looking toward one end thereof.

Figure 3 is a sectional view taken on the line 3—3 of Figure 1 looking in the direction of the arrows.

Similiar reference characters indicate corresponding parts throughout the several views in the drawing.

Referring to the drawing in detail, A designates generally a portion of the device constructed in accordance with the invention, and comprises a stem or handle bar, pole or the like 10 having at one end a ratchet acting adjustable coupling or joint 11 interconnecting a substantially equilateral triangular shaped head 12 with the stem, handle bar, pole or the like 10, which latter gives reach to the device A in the use thereof.

This head 12 has a part thereof an outwardly bent substantially arcuate shaped stationary jaw 13, having in association therewith at opposite ends thereof upwardly curled opposed resilient fingers or springy leaves 14 with terminal bearings 15 for contacting rollers 16.

Hinged to the head 12 is a substantially U-shaped bail forming a movable jaw 17, which has at opposite ends upwardly and inwardly curled fingers or gripping tines 18, provided with cushioned terminals 19. The bail or jaw 17 is tensioned by a coiled spring 20 which urges it into gripping position, intermediate of the fingers or leaves 14 next thereto.

The bail 17 is formed with a crank 21 medially thereof to which is connected a pull cable 22, so that it can be opened, and thus permitting a fluorescent light tube to be received between the fingers or leaves 14 to be retained seated in the jaws on the head 12, while the tines under tension of its spring will firmly and securely grip the said tube for its placement in or removal from a fixture for such tube.

The head 12 can be adjusted at an angle to the longitudinal axis of the stem, handle bar, pole or the like 10, according to the set of the fixture for receiving or the removal of the tube, as should be clearly understood.

The tube in the handling thereof by the device cannot become damaged thereby, and the latter affords an overhead reach for the placing and removal of the light tube, as the stem, handle bar, pole or the like can be of any selected length, or adjustable.

What is claimed is:

1. A device of the kind described, comprising a reach member having at one end a ratchet acting adjustable coupling, a substantially equilateral triangular shaped head adjustably connected thereto, opposed springy fingers on the head and having contact rollers approaching each other from opposite sides of the head, and a manually operated gripping bail positioned intermediate of said fingers and carried by the head at one side thereof.

2. A device of the kind described, comprising a reach member having at one end a ratchet acting adjustable coupling, a substantially equilateral triangular shaped head adjustably connected thereto, opposed springy fingers on the head and having contact rollers approaching each other from opposite sides of the head, a manually operated gripping bail positioned intermediate of said fingers and carried by the head at one side thereof means urging the bail to gripping position, for coaction with said fingers, and means for retracting said bail from gripping position.

IRIS M. SMITH.